United States Patent [19]

Satoh et al.

[11] Patent Number: 4,702,063
[45] Date of Patent: Oct. 27, 1987

[54] GRASS COLLECTING BAG FOR LAWN MOWER

[75] Inventors: Masatoshi Satoh, Tokyo; Junichi Akaike, Chofu, both of Japan

[73] Assignee: Kioritz Corporation, Tokyo, Japan

[21] Appl. No.: 823,247

[22] Filed: Jan. 28, 1986

[30] Foreign Application Priority Data

Feb. 1, 1985 [JP] Japan .............. 60-13273[U]

[51] Int. Cl.⁴ ............................................. A01D 34/70
[52] U.S. Cl. ...................................................... 56/202
[58] Field of Search .................... 56/202, 16.6

[56] References Cited

U.S. PATENT DOCUMENTS 3,716,977  2/1973  Jackson ................................. 56/202
3,820,313  6/1974  Hoffman ............................... 56/202
3,928,956 12/1975  Boyer ................................... 56/202
4,149,362  4/1979  Haffner et al. ....................... 56/202
4,214,424  7/1980  Gobin et al. .......................... 56/202
4,238,918 12/1980  Saruhashi et al. .................... 56/202
4,250,698  2/1981  Pappalardo et al. .................. 56/202
4,326,370  4/1982  Thorud .................................. 56/202
4,345,418  8/1982  Arizpe ................................... 56/202

Primary Examiner—Paul J. Hirsch
Attorney, Agent, or Firm—Browdy and Neimark

[57] ABSTRACT

A grass collecting bag for a lawn mower comprises a bag member opened at its one end and a cover member attached to the bag member so as to cover the open end of the bag member, the cover member being completely separable from the bag member.

2 Claims, 1 Drawing Figure

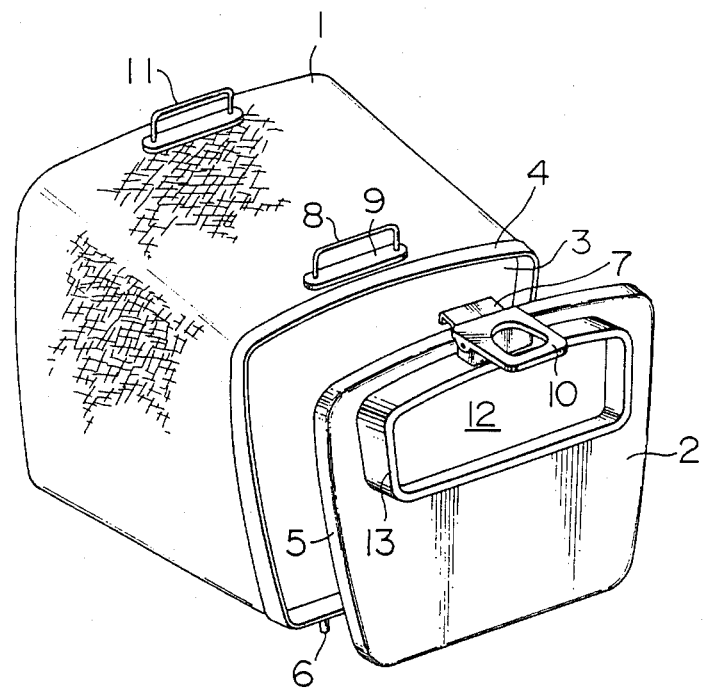

GRASS COLLECTING BAG FOR LAWN MOWER

BACKGROUND OF THE INVENTION

1. Field of the Invention

The present invention relates to a grass collecting bag for a lawn mower.

2. Description of the Prior Art

A power-driven lawn mower is known in which grasses cut by a rotary cutter on the underside of the lawn mower are charged into a grass collecting bag through a grass transfer duct, whereby the grasses are collected in the bag. In general, the grass collecting bags are detachably secured to the rear end of the body of the lawn mower. A typical example of the conventional grass collecting bag has a bag member made of an air-permeable material such as a woven cloth and opened at its one end, and a cover member which is attached to the open end of the bag member so as to cover the open end of the bag member. The interior of the bag member is communicated with the grass transfer duct of the lawn mower through an aperture formed in the cover. The cover is hinged to the bag so as to be swingable away from the bag member thereby allowing the grasses in the bag member to be ejected. In this type of the grass collecting bag, however, the ejection of the grasses is inconveniently hindered by the presence of the cover member, even though the cover member is swingable to open the bag member.

In another type of known grass collecting bag, the opening of the bag member has a small area corresponding to the area of the outlet of the grass transfer duct so that the bag member can be connected directly to the grass transfer duct without intermediary of the cover. In this case, however, the ejection of the grasses from the bag member is difficult due to too small area of opening of the bag member.

SUMMARY OF THE INVENTION

Accordingly, an object of the invention is to provide a grass collecting bag for a lawn mower which has a bag member and a cover member separable from each other, thereby overcoming the above-described problems of the prior art.

To this end, according to the invention, there is provided a grass collecting bag for a lawn mower comprising: a bag member opened at its one end; and a cover member attached to the bag member so as to cover the open end of the bag member, the bag member being completely separable from the cover member.

With this arrangement, the cover member can be completely separated from the bag member so that the bag can be opened largely to facilitate ejection of the grasses from the bag. Thus, the ejection of the grasses from the bag member is not at all hindered by the cover member.

BRIEF DESCRIPTION OF THE DRAWING

The attached sole Drawing is an exploded perspective view of an embodiment of the grass collecting bag in accordance with the invention.

DESCRIPTION OF THE PREFERRED EMBODIMENT

A preferred embodiment of the invention will be described hereinunder with reference to the drawing.

A grass collecting bag embodying the present invention has a bag member 1 and a cover member 2. The bag member 1 is made of an air-permeable woven cloth and having an ample space for collecting grasses therein. The bag member 1 is closed at its one end and opened at its other end as at 3. A reinforcement band 4 is provided on the open brim of the opening 3 so as to maintain the opening 3 in a substantially rectangular form.

The cover member 2 is made by casting from a suitable plastic material and has a peripheral flange 5 which is adapted to fit around the reinforcing band 4. A pair of pins 6 are provided on the underside of the brim of the opening 3 so as to project downwardly therefrom, although only one of them is shown. For fitting the brim of the opening 3 of the bag member 1 in the flange portion 5 of the cover member 2, the pins 6 are inserted into a pair of holes (not shown) formed in the lower side of the flange 5. A spring-biased retaining claw 7 is pivotally secured to the upper side of the cover member 2. The arrangement is such that, when the cover member 2 is attached to the bag member 1, the retaining claw 7 engages with a base portion 9 of a handle 8 secured to the upper side of the brim of the opening 3 of the bag member 1, thereby retaining the cover member 2 on the bag member 1. The retaining claw 7 is formed integrally with a lever 10. As this lever 10 is depressed, the retaining claw 7 is pivoted upwardly out of engagement with the base portion 9 of the handle 8 on the bag member 1, so that the cover member 2 is completely separable from the bag member 1. The bag member 1 is provided with another handle 11 on a rear upper portion thereof, for facilitating the handling of the bag member 1. When the user carries the grass collecting bag, the user holds both the rear handle 11 and the lever 10, so that the lever 10 is swung upwardly to securely keep the retaining claw 7 in engagement with the base portion 9 of the front handle 8. The separation of the cover member 2 from the bag member 1 can be done by a single action for depressing the lever 10.

The cover member 2 is provided in an upper portion thereof with a rectangular aperture 12 which is surrounded by a rim 13 formed on the outer surface of the cover member 2. The rim 13 is adapted to fit in the outlet opening of a grass duct (not shown) formed in the body of the lawn mower, so that the interior of the bag member 1 is communicated with the duct through the aperture 12.

What is claimed is:

1. A grass collecting bag for a lawn mower comprising:
    a bag member having an opening at one end and a brim around the opening;
    a cover member attached to said bag member so as to cover said opening of said bag member, said cover member having a flange portion and being completely separable from said bag member to facilitate removal of grasses from the bag; and
    a retaining means pivotally secured to said cover member and adapted to retain said cover member on said bag member;
    wherein said brim of said opening of said bag member is reinforced by a reinforcing member such that said opening maintains a predetermined shape, the reinforced opened end of said bag member being adapted to fit in said flange portion of said cover member,
    said retaining means has a lever to control retaining of said cover member to said bag member for portable removal of a unit from said lawn mower, said lever being usable as a handle by lifting said lever for carrying said bag member and said cover member when connected by said retaining means and disconnected from said lawn mower, and said retaining means is located with respect to said bag member and cover member so that when said lever is lifted to be used as said handle, said retaining of said cover member to said bag member is provided, and so that said retaining can be ended by pushing said lever down, after setting down said bag member with said cover member retained thereto.

2. A grass collecting bag for a lawn mower according to claim 1, wherein said cover member has an aperture formed in an upper portion thereof and a rim formed integrally therewith such as to surround said aperture, said rim being adapted to fit in and to be portably removed with said bag member from an end of a duct formed in the body of said lawn mower.

* * * * *